Dec. 5, 1967 G. J. BOUYOUCOS 3,356,979
MOISTURE SENSITIVE RESISTOR
Filed Feb. 28, 1966

INVENTOR
GEORGE J. BOUYOUCOS
BY
*Miller, Morriss & Pappas*

ATTORNEYS

United States Patent Office 3,356,979
Patented Dec. 5, 1967

3,356,979
MOISTURE SENSITIVE RESISTOR
George J. Bouyoucos, 706 N. Hagadorn,
East Lansing, Mich. 48823
Filed Feb. 28, 1966, Ser. No. 530,385
5 Claims. (Cl. 338—35)

ABSTRACT OF THE DISCLOSURE

An improved moisture sensitive resistor, which is made from unaridized gypsum cements, for use with electrical resistance measuring devices for measuring the moisture contents of its environs, particularly useful and superior in measuring the moisture content of gases.

---

Figure 1:
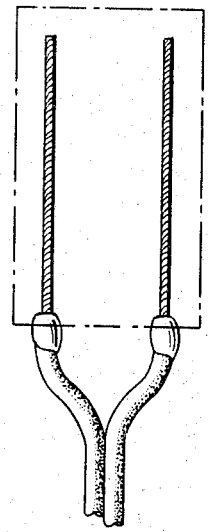

This invention relates to an improved moisture sensitive electrical resistor used in electrical resistance apparatus for measuring the moisture content of its environs.

Several types of apparatus have been employed for measuring moisture content. The three oldest devices used for measuring moisture content of air and other gases are the wet and dry bulb thermometers, the hair hygrometer and the dew point apparatus. For various reasons, these three devices are not suitable or convenient for general use.

The wet and dry bulb thermometers are inconvenient and slow in use. The method is quite inaccurate at very high humidities and entirely unsuited for the determination of low relative humidities.

The hair hygrometer employs a hair which contracts and extends with changes of humidity. The hair loses its elasticity and the calibration of the hygrometer changes with its use.

The dew point apparatus is a complex apparatus, principally a laboratory apparatus and not suitable for general use.

A variety of electrical devices for measuring the moisture content of solids, such as soil, and air and other gases have been proposed and used. Of those which are convenient and economical for general use, for example, in measuring the moisture content of air and soil, many comprise a moisture sensitive electrical resistor and a suitable instrument for measuring the resistance of the resistor. Generally, such resistors comprise two electrodes imbedded within a material, the moisture content of which varies with that of its environs and the electrical resistance of which material varies with its moisture content. As the moisture content of the environs increases or decreases, the moisture content of the resistor material increases or decreases and the electrical resistance of the resistor decreases or increases, respectively. Thus, after the resistor has been calibrated by measuring its resistance at several known levels of moisture content, the resistance of the resistor becomes a measure of the moisture content of its environs.

There are several types of resistor materials in use. Of those devices which are of general use in measuring the relative humidity of air or other gases, many make use of hydroscopic, electrolytic salts such as lithium chloride or other water soluble salts. Resistors made with these materials have the disadvantage that they do not keep their original calibration. This is probably due to loss of the electrolytic salt from the resistor during use. Loss of electrolyte occurs quickly when the resistor is exposed to a high moisture content or more slowly, but measurably, when the resistor is exposed to the changing temperature and humidity conditions to which a relative humidity measuring device is normally exposed, particularly for outdoor use. Loss of even minute amounts of the electrolyte results in a change in the calibration of the resistor, necessitating frequent recalibrations. Loss of larger amounts of the electrolyte results in complete destruction of the usefulness of the resistor.

Plaster of Paris has also found frequent use as a resistor material. Resistors comprising dual electrodes imbedded within a block of plaster of Paris are more durable for handling than are those hereinbefore described employing electrolytic salts. The plaster of Paris resistors maintain their original calibrations longer than those hereinbefore described. However, even these plaster of Paris resistors have the disadvantage that under quite wet conditions or fairly long periods of use they also do not maintain their original calibration and begin to dissolve and disintegrate. As this occurs the accuracy diminishes rapidly and the resistor must be recalibrated quite frequently or replaced.

The resistor of two electrodes imbedded within a homogenous mixture of plaster of Paris and glycerine, as described in U.S. Patent 2,367,561, was a substantial improvement in the art. However, after extended exposure to the varying temperature and humidity conditions of outdoor use, that resistor has been found to undergo changes in its calibration. This is probably due to the slow loss of glycerine and slow erosion of the plaster of Paris.

The invention of U.S. Patent 2,636,962 was another advance in the art. The resistor described in that patent comprises two electrodes enclosed within and separated by a thin layer of a dielectric material such as a woven nylon fabric. Although the resistor has the advantage of maintaining its calibration for a longer period of time, the resistor is slow in responding to changes in the moisture content of its environs, particularly at low moisture contents. The resistor is therefore not readily and suitably adapted to use under dry conditions or in the measurement of the relative humidity of air and other gases.

The resistor described in U.S. Patent 2,740,032, comprising a dual electrode and plaster of Paris block system impregnated with a suitable resin, was an advance in the art, particularly for measuring the moisture content of soils. However, this resistor is quite slow in responding to changes of moisture content, particularly at low moisture contents. Therefore, this resistor is not particularly suited for use in soils having fairly low moisture content and in measuring the relative humidity of air. Furthermore, although this resistor is more permanent and maintains its original calibration longer than plaster of Paris resistors not impregnated with a suitable resin, it has been surprising to find that, in spite of the impregnation with resin, this resistor also does not maintain its original calibration.

Therefore, it is an object of the present invention to provide an improved moisture sensitive electrical resistor which may be used with electrical resistance measuring devices for measuring the moisture content of the environs of the resistor. More specifically it is an object of this invention to provide a moisture sensitive electrical resistor which may be used with electrical resistance measuring devices for measuring the moisture content of the environs of the resistor and which has in combination the characteristics of being durable and stable, resistant to deterioration by moisture, maintaining its original calibration, accuracy, sensitivity and rapidity of response.

Other objects of this invention and advantageous features will become apparent as this description proceeds.

The present invention is an improved moisture sensitive electrical resistor for use with electrical resistance measuring devices for measuring the moisture content of the environs of the resistor, said resistor comprising an electrode system imbedded within a plaster block made from a plaster cement which is substantially free of electrolytic materials whose solubilities are greater than that of the final plaster block per se. I have discovered that, whereas similar moisture sensitive electrical resistors of the prior art made with aridized plaster cements such as plaster of Paris tend to lose their calibrations and tend to dissolve or disintegrate during use, resistors of this invention hold their calibrations more permanently and are more durable, even under conditions of high moisture content. In combination with the above stated advantages, the resistors of this invention possess accuracy, sensitivity, and rapidity of response which are comparable to and in most instances superior to those resistors of the prior art.

Plaster resistors known and used in the prior art have been made by imbedding the electrode system within the common commercially available plaster cements such as plaster of Paris. These plaster cements are made from gypsum which is the dihydrate of calcium sulfate. A plaster cement can be made by grinding gypsum to a suitable fineness and calcining it with agitation at atmospheric pressure and at temperatures not in excess of 350° F. For use as a cement, the calcined product is mixed with an appropriate amount of water, shaped as desired and allowed to set and dry. A critical property of such cements, particularly in the manufacture of molds for use in the ceramics industry, is the amount of water necessary to provide a suitably workable mass which will set and dry to form an acceptable product. Product produced as hereinbefore described is quite variable in this respect and, upon storage, this property changes. Such cement is therefore undesirable in much of the industry in which plaster cements are used. In order to overcome this disadvantage, a small amount of a water solution of a deliquescent salt is sprayed into the reactor or kettle during calcination. This process is termed "aridizing" and the product is termed an "aridized plaster." The deliquescent salts which are used are electrolytic materials, such as aluminum sulfate, sodium sulfate, potassium sulfate, potassium carbonate, and borax, which are more water soluble than the final plaster cast itself. The aridized product is much more uniform and stable during storage than is the "unaridized" product. The common, commercially available plaster cements, e.g., plaster of Paris, being aridized plasters, contain water soluble electrolytes.

When gypsum is calcined without agitation and without aridizing at pressures in excess of atmospheric pressure at a temperature of about 250° F., there is produced another product, known in the ceramics industry as "alpha gypsum." No water soluble electrolytes are added. Alpha gypsum has the same chemical analysis as the regular aridized plasters described above, apart from the salt added during aridizing, but markedly different physical properties. The crystals of regular plaster are small and fractured, probably a result of agitation during the calcining. The crystals of alpha gypsum are comparatively larger, denser, more stubby-shaped, and less porous.

Unaridized plaster cements made from gypsums which are substantially free of electrolytic materials which have water solubilities greater than the water solubility of the final plaster block can be used to prepare the resistors of this invention. More specifically, unaridized alpha gypsums, made from gypsums which are substantially free of electrolytic materials which have water solubilities greater than the water solubility of the final plaster block can be used to prepare the resistors of this invention.

I have also discovered how to use these materials to make moisture sensitive electrical resistors having electrical resistances which can be measured conveniently with economical, readily available electrical resistance measuring devices.

Figure 2:
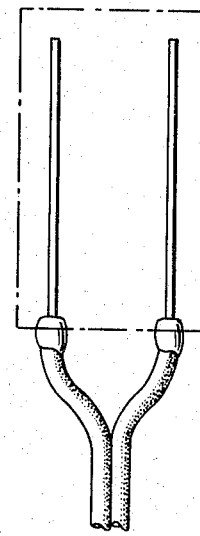
Figure 3:
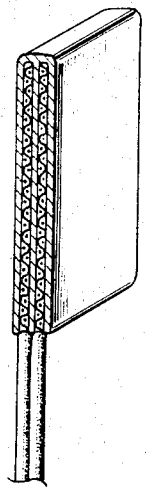
Figure 4:
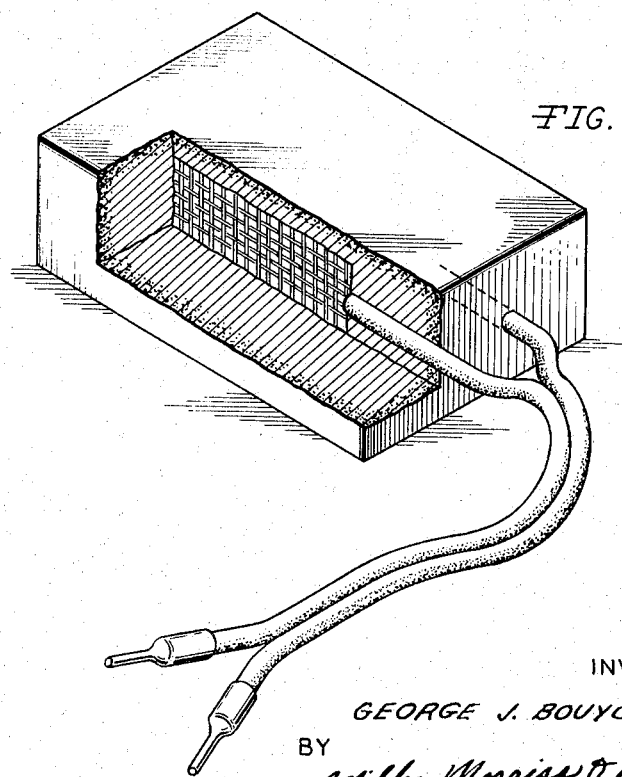

A resistor accomplishing the objects of this invention can be made by enclosing a duel electrode system within the plaster cement such as illustrated in the drawings. The dual electrode system may consist of either twisted tinned wire cables, such as illustrated in FIGURE 1, or short, thick metal tips soldered to the appropriate leads, such as illustrated in FIGURE 2, or wire screens soldered to appropriate leads, such as illustrated in FIGURE 3 and FIGURE 4 which is a cutaway view illustrating two wire screen electrodes embedded within the plaster cement block. The electrodes are placed in a parallel, face-to-face position and are separated by and completely encompassed by the cement. Other electrode systems will be obvious to those skilled in the art and are meant to be a part of this invention.

The following example illustrates the preparation of the novel resistor:

*Example I*

The plaster cement used in this example was an unaridized alpha gypsum cement made from gypsum taken from deposits in Iowa. (This cement is sold by United States Gypsum Company as gray Hydrocal, "Hydrocal" being a trademark of United States Gypsum Company.) This cement is further characterized in that it has a setting time of about twenty to thirty minutes, a typical setting expansion of about 0.003 inch per inch, and a normal consistency of about 40 to 43. The term "normal consistency" will be recognized by one skilled in the art as being the number of parts by weight of water to be added to one hundred parts by weight of the cement to obtain a slurry of optimum consistency. A plaster cement produced in an identical way but from gypsum taken from deposits in Oklahoma has the same characteristics as that described, although whiter in color, and behaved similarly.

Two electrodes, 13.75 cm. long and 2.031 cm. wide, are cut from 20 x 20 mesh screen made of 0.0375 cm. stainless steel wire. The electrodes are placed in a parallel, face-to-face position but separated at a distance of 0.10 mm., the thickness of a medium weight writing paper. This distance is established by placing slips of writing paper of this thickness between the screen electrodes at three different locations and holding the slips of paper in place with small clips. The edges of the screen electrodes are then touched with a slurry of the plaster cement containing 37.5 percent by weight of distilled water. The partially made resistor is allowed to set. After it has set, the slips of paper are removed and the partially made resistor is cast completely in the cement slurry and held in a long, narrow mold. The unit is allowed to cure two days in the mold and four weeks in air, after which time it is polished to an overall thickness of about 0.16 cm. This resistor was calibrated by the method described below.

Several units made at different times by this procedure have been found to agree with one another to within 1 percent or less. Resistors made according to this description are suitable for measuring the entire range of relative humidity of air.

A variety of devices may be used for measuring the electrical resistance or total electrical impedance of the resistor. Two types of conductivity bridges have been used with the resistor described above. One is a low current level, alternating current resistance bridge which sends less than 25 microamperes into the unit. Another is a moderately high current level resistance bridge. Both have a range of from zero to 6.5 million ohms. Alternating current bridges are preferred so as to prevent the occurrence of any possible polarization in the resistor. Both bridges work well in the lower resistance ranges, but in the higher resistance ranges, e.g., above a million ohms, care is required to obtain an accurate reading. In fact, because of the fundamental design of the resistor, with the close proximity of large electrodes, the determination should be that of its total impedance rather than of simply its resistance in order to obtain the most accurate value of the moisture content. An impedance bridge employing an alternating current of 100 cycles per second has been used successfully.

A resistor made according to this invention can be calibrated in several ways. The resistor can be calibrated by measuring its resistance under given conditions and relating the resistance thus determined with the moisture content or relative humidity as determined by any suitable, alternate means. The resistor described above was calibrated by the saturated salt solution method, one of the most accurate methods for establishing atmospheres of known relative humidity. This method is based on the known fact that the confined air space above the surface of a saturated solution of certain salts in water has a known moisture content or relative humidity. Distilled water is mixed with an excess of the appropriate salt so as to provide a slurry about 4 cm. deep in the bottom of a two-quart jar. The resistor is suspended by its insulated connecting wires extending through and sealed into a hole in the screw cap of the jar. By means of the screw cap and a rubber ring the resistor can be enclosed in the sealed off air space above the salt-water slurry and its resistance or impedance measured after the system has come to equilibrium at a chosen temperature.

Table I shows the results of the calibration of the resistor described above by the saturated salt solution method at 22.5° C. Table I identifies the various salts used, the relative humidity associated with each salt, the corresponding ohms resistance of the resistor determined in a wetting cycle, that is, as the resistor was subjected to successively higher relative humidities, and the corresponding ohms resistance of the resistor determined in a drying cycle, that is, as the resistor was subjected to successively lower relative humidities.

TABLE I

| Name of Salt | Relative Humidity of Salts 22.5° C. (percent) | Wetting Cycle, ohms | Drying Cycle, ohms |
| --- | --- | --- | --- |
| Water | 100 | 390 | 390 |
| $K_2SO_4$ | 97.0 | 1,700 | 1,680 |
| $KNO_3$ | 93.2 | 5,500 | 6,100 |
| NaCl | 75.5 | 100,000 | 103,000 |
| $Mg(NO_3)_2.6H_2O$ | 54.0 | 650,000 | 645,000 |
| $MgCl_2.6H_2O$ | 33.2 | 2,000,000 | 2,000,000 |
| $KC_2H_3O_2$ | 20.0 | 4,000,000 | 3,981,000 |
| $LiCl.H_2O$ | 12.2 | 6,600,000 | 6,600,000 |

From Table I it can be seen that at 22.5° C. the resistor constructed as described above has a resistance range of from 390 ohms at 100 percent relative humidity to 6,600,000 ohms at 12.2 percent relative humidity. This is a range of resistances conveniently measured by available, economical resistance measuring devices. Furthermore, Table I shows that the resistor has a well-proportioned pattern of response over the entire range and that the resistor has a high sensitivity in the high relative humidity range of 100 to 75 percent.

In Table I, the column entitled "Wetting Cycle" shows the resistance of the resistor as it was being subjected to successively higher moisture contents. The column entitled "Drying Cycle" shows the resistance of the resistor as it was being subjected to successively lesser moisture contents. The data show that there is only very little hysteresis associated with the resistor; that is, the resistance of the resistor at a given moisture content was substantially the same regardless of whether it was previously exposed to a higher or a lower moisture content.

A resistor prepared according to this invention is substantially permanent. Such a resistor has been used for three years under a variety of climatic conditions for determining the relative humidity of air. Over this period of time there was no measurable change in the calibration of the resistor. Its original calibration remained substantially the same. The resistor can be washed with distilled water without incurring a measurable change in its calibration. This characteristic indicates that the successful use of the material is not dependent upon the presence of hygroscopic, water soluble ingredients. The substantial absence of hygroscopic, water soluble ingredients is advantageous.

The resistor made according to the above example showed rapid response to changes of the moisture content of its surroundings. A period of only ten minutes was required for a resistor to indicate a relative humidity of 93 percent when it was moved from a chamber of 12 percent relative humidity at 22.5° C. to a chamber containing pure water at 22.5° C. A somewhat slower response in the relative humidity range of 95 to 100 percent is not peculiar to the resistor of this invention. Other resistors known and used in the prior art exhibit a similar behavior in this high range.

The resistor of this invention gives rapid response to decreases of moisture content. A resistor at equilibrium under conditions of 100 percent relative humidity at 22° C. required only 15 minutes to arrive at equilibrium under conditions of 75.5 percent relative humidity. A change from 75.5 percent to 54.0 percent required only 6 minutes; from 54.0 percent to 33.2 percent, 1.5 minutes; from 33.2 percent to 12.0 percent, almost instantaneous. Only 4 minutes were required to achieve equilibrium when the resistor was moved from a chamber at 100 percent to a room at 20 percent relative humidity at 22° C.

The rapidity of response of the resistor is probably due in no small part to its design. Because of the nature of the material used to encompass the electrodes, the resistor can be designed to be thin, having thin outside walls as well as a small separation of the electrodes. Both sides of the unit are exposed to its surroundings. Moreover, the rapidity of response is probably related directly to the properties of the material. Because of the low water content of the slurry from which the cast was made, the pore space of the cast is very small. The amount of water absorbed by the resistor is small. A resistor constructed as described above and dried over lithium chloride was found to have absorbed only about 2, 4, 7 and 10 milligrams of water at 54.0, 75.5, 93.2 and 100 percent relative humidity in air at 22.5° C.

The resistor constructed as described above was used to measure the relative humidity of air at temperatures varying from about 2° C. to 27° C. The results were found to compare favorably with determinations made with a psychrometer. A comparison of the values obtained by the two methods indicated that temperature changes do not exert a significant influence on this resistor. Thus, for ordinary use of the resistor for measuring the relative humidity of air in the open, no correction for changes of temperature need be made.

A resistor constructed as heretofore described, but with electrodes only 3.7 cm. long and 1.1 cm. wide, had a resistance of 19,000 ohms at 100 percent relative humidity and 985,000 ohms at 75 percent relative humidity. This resistor, because of its smaller size, gives even more rapid response to changes of moisture content than the larger resistor heretofore described. It has been shown that the large resistor heretofore described is suitable over the entire range of relative humidity of air and over a wide temperature range. However, resistors can be designed for use in selected ranges.

The examples illustrate that by varying the size of the electrodes and the plaster block, electrical resistors can be made for determining moisture contents greater and/or lesser than those encountered in air. That is, small resistors can be made which have conveniently measurable resistances at high moisture contents, and large resistors can be made which have conveniently measurable resistances at low moisture contents. Furthermore, one skilled in the art would recognize that resistors having higher resistance ranges than those described in the examples can be made by constructing them with greater separation of the electrodes.

Another factor affecting the electrical properties and moisture absorbing characteristics of resistors made according to this invention is the pore size of the plaster block. The pore size is related to the ratio of water to cement in the slurry used to form the block. The use of a large ratio provides a block with a larger pore size than does the use of a small ratio. Those skilled in the art would recognize that resistors having a large pore size would absorb more water and therefore have lesser electrical resistance than those having a small pore size.

Thus, by varying the overall size of the electrodes, the distance separating the electrodes, and the pore size, resistors could be made for convenient application to the measuring of greater or lesser moisture contents than normally encountered in measuring the relative humidity of air. One example of such other applications is the measurement of the moisture content of soils. The advantages of resistors made according to this invention over resistors known in the prior art, which advantages have been described heretofore, are important in the measuring of the moisture content of soil as they are in the measurement of the relative humidity of air.

The foregoing examples and descriptions serve to illustrate this invention, but not to limit its scope. Various modifications will be apparent to those skilled in the art.

I claim:

1. An improved moisture sensitive electrical resistor for use with electrical resistance measuring devices for measuring the moisture content of gases, said resistor comprising an electrode system imbedded within a plaster block made from an unaridized gypsum cement.

2. The improved moisture sensitive electrical resistor of claim 1 wherein the unaridized gypsum cement is unaridized alpha gypsum cement.

3. The improved moisture sensitive electrical resistor of claim 2 wherein the electrode system comprises two metal wire screens.

4. The improved moisture sensitive electrical resistor of claim 2 wherein the unaridized alpha gypsum cement is made from gypsum taken from gypsum deposits in the State of Iowa, said cement having a setting time of about twenty to thirty minutes, a typical setting expansion of about 0.003 inch per inch, and a normal consistency of about 40 to 43.

5. The improved moisture sensitive electrical resistor of claim 4 wherein the electrode system comprises two wire screen electrodes, 13.75 cm. long and 2.031 cm. wide, cut from 20 x 20 mesh screen made of 0.0375 cm. stainless steel wire, in a parallel face to face position and separated by a distance of 0.1 mm.

References Cited
UNITED STATES PATENTS

| | | | |
|---|---|---|---|
| 1,931,240 | 10/1933 | Randel et al. | 106—110 |
| 2,367,561 | 1/1945 | Bouyoucos | 338—35 |
| 2,636,962 | 4/1953 | Bouyoucos | 338—34 |
| 2,729,099 | 1/1956 | Rosenthal | 338—34 |
| 2,740,032 | 3/1956 | Bouyoucos | 338—34 |
| 2,754,220 | 7/1956 | Gardner | 106—110 |
| 2,793,527 | 5/1957 | Turner et al. | 338—35 |
| 3,181,098 | 4/1965 | Richards | 324—65 |

RICHARD M. WOOD, *Primary Examiner.*

W. BROOKS, *Assistant Examiner.*